April 17, 1951  W. J. WHITE  2,549,035
RADIATOR BALL AIR RELIEF VALVE
Filed June 2, 1947
FIG. 1.
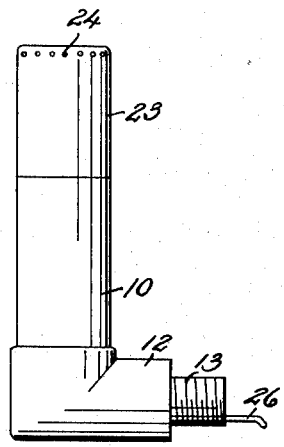
FIG. 2.
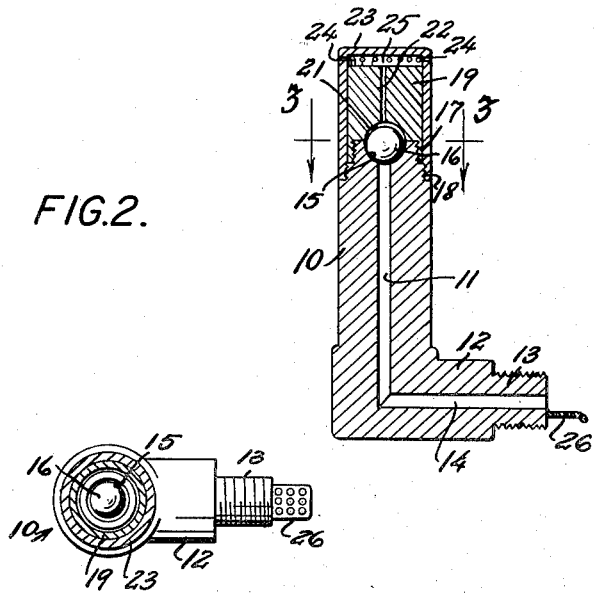
FIG. 3.
INVENTOR.
William J. White
BY Victor J. Evans Co.
ATTORNEYS Patented Apr. 17, 1951

2,549,035

UNITED STATES PATENT OFFICE 2,549,035

RADIATOR BALL AIR RELIEF VALVE

William J. White, Coxsackie, N. Y.

Application June 2, 1947, Serial No. 751,793

1 Claim. (Cl. 137—122)

This invention relates to a radiator ball air relief valve.

It is an object of the present invention to provide a ball relief valve adapted for use with radiators to permit the outward flow of air from a radiator when the same is first being charged with steam wherein the ball will rotate under the slightest pressure to allow the air to work out and wherein the space confining the ball is small allowing a lifting movement of the ball of a very small fraction of an inch so that the ball will not be permitted any large strokes so as to make the valve noisy and wherein provision is made for catching a few drops of water condensate before it overflows the valve and deposits on the floor and wherein the water may thereafter be humidified and dissipated into the room.

Other objects of the present invention are to provide a radiator ball air relief valve which has only one movable part, is of simple construction, easy to disassemble and clean, inexpensive to manufacture and efficient in operation.

For other objects and for a better understanding of the invention, reference may be had to the following detailed description taken in connection with the accompanying drawing, in which Fig. 1 is a side elevational view of the air valve embodying the features of the present invention.

Fig. 2 is a cross-sectional view, in elevation, of the air valve shown in Fig. 1.

Fig. 3 is a transverse cross-sectional view taken on line 3—3 of Fig. 2.

Referring now to the figures, 10 represents the body part of the valve which has a central opening 11 and a laterally extending portion 12 with a threaded projection 13 thereon adapted to be screwed into a radiator. The passage 11 connects with a laterally extending passage 14. The upper end of the body part 10 has a concaved seat 15 for receiving a ball 16 of steel. Also the upper end of the body part has two threaded portions 17 and 18. The threaded portion 17 receives a member 19 having a valve seat 21 lying above the ball 16. A central bore 22 extends from the ball chamber provided by the seats 15 and 21 to the top of the member 19. Over the member 19 and connected to the threaded portion 18 is an inverted cup shaped closure member 23 having holes 24 therein elevated from the top of the member 19 and extending from a space 25. Within this space 25 water may collect and will be dissipated and humidified as the radiator becomes warm and hence will be retained against overflowing the valve and dropping on the floor so as to create a spot thereon.

On the laterally extending portion 12 is a perforated projection 26 which will prevent dirt and the like from entering the passage 14.

In operation, the ball is revolved by the slightest pressure, allowing air to work out as it revolves. The ball having no sharp projections thereon can take up minimum space and can be provided with a good seat on which to rest. Air and steam cannot occupy the same space so that the moment the air is eliminated from the space containing the ball, the steam appears. The force used by the steam to push out the air is sufficient to move the ball the slight distance of one sixty-fourth of an inch to seal off the valve and thereby hold the steam in the radiator. The steam once arrested builds up sufficient pressure to further assure the holding of the ball in place.

The ball inasmuch as it revolves does not allow any sediment to collect and thereby insures a perfectly operated valve. It should further be apparent that there has been provided a valve which is of simple construction, easy to clean and absolutely silent in operation. It will be further apparent that with the valve seats being of spherical shape to receive the ball that there is little opportunity for moisture to leave the valve and that such moisture that may is confined to the space 25 wherein it can be readily dissipated into the air within the room to humidify the same.

As the steam pressure recedes, the ball is pulled down upon the seat 15. This action is so fast and the travel distance so slight that no air is drawn into the radiator, making almost a perfect vacuum within the radiator so as to keep the radiator warm for a longer period of time, inasmuch as no returning air is passing through the radiator to chill it. The absence of air gives almost immediate benefit of steam when the steam heat is again turned on. Due to the elimination of air returning to the radiators, the radiators give off considerably more heat. Accordingly for a given installation less radiator footage is needed and there will be less boiler operation and a saving of fuel.

While various changes may be made in the detail construction, it shall be understood that such changes shall be within the spirit and scope of the present invention as defined by the appended claim.

Having thus set forth and described my invention, what is claimed is.

A radiator ball air relief valve comprising an L-shaped body part provided with a straight vertical portion and a laterally extending portion and each portion provided with a central opening therein in communication with each other, a reduced threaded projection on the laterally extending portion of the body part for mounting the same, a perforated projection at the outer end of said threaded projection for preventing dirt or foreign matter from entering the valve, and the opening in said laterally extending portion and said threaded projection having its entrance located above the perforated projection, the straight portion of said body part having a semi-spherical seat at the top of the central opening therein, a ball valve adapted to close the seat and to be rolled in the same when acted upon by air pressure, a member secured to the top of the straight portion of the body part having a semi-spherical seat and an outlet passage extending therefrom, said member being attached to the straight portion of the body part with the semi-spherical seats opposing each other to form a spherical chamber for containing the ball valve, said ball being adapted to be lifted into the seat of the member when sufficient steam pressure has been built up and after the air has left the body part, and a closure cap adapted to be extended over the member and secured to the upper end of the straight portion of the body part to provide a space above the top of the member wherein moisture may collect and openings in the closure cap elevated above the top surface of the member through which the moisture may be dissipated to humidify the air adjacent said cap openings.

WILLIAM J. WHITE.

REFERENCES CITED

The following references are of record in the file of this patent:

UNITED STATES PATENTS

| Number | Name | Date |
|---|---|---|
| 116,608 | Lungren | July 4, 1871 |
| 592,690 | Bragger | Oct. 26, 1897 |
| 721,521 | Leuthesser | Feb. 24, 1903 |
| 1,092,782 | Miles | Apr. 7, 1914 |
| 1,476,618 | Jones | Dec. 4, 1923 |
| 1,749,128 | Buss | Mar. 4, 1930 |
| 1,767,056 | Donnelly | June 24, 1930 |